(12) United States Patent
Salameh

(10) Patent No.: US 6,935,009 B2
(45) Date of Patent: Aug. 30, 2005

(54) PROCESS FOR PRODUCTION OF SEALING ELEMENTS AND SEALING ELEMENT

(75) Inventor: Ralf Salameh, Gondelsheim (DE)

(73) Assignee: Federal-Mogul Sealing Systems Bretten GmbH & Co. KG, Bretten (DE)

( * ) Notice: Subject to any disclaimer, the term of this patent is extended or adjusted under 35 U.S.C. 154(b) by 16 days.

(21) Appl. No.: 10/639,937

(22) Filed: Aug. 13, 2003

(65) Prior Publication Data

US 2004/0074091 A1 Apr. 22, 2004

(30) Foreign Application Priority Data

Aug. 13, 2002 (DE) .......................................... 102 37 019

(51) Int. Cl.[7] .............................................. B21D 35/00
(52) U.S. Cl. ...................... 29/469.5; 29/527.4; 72/379.2
(58) Field of Search ............................. 29/888.3, 527.4, 29/469.5; 277/628, 647, 641; 72/335, 365.2, 366.2, 377, 379.2

(56) References Cited

U.S. PATENT DOCUMENTS

| | | | | |
|---|---|---|---|---|
| 1,925,804 A | * | 9/1933 | Hiering | 72/377 |
| 3,322,996 A | * | 5/1967 | Schrager | 72/379.2 |
| 3,825,459 A | * | 7/1974 | Taylor | 264/145 |
| 4,333,221 A | * | 6/1982 | Hayashi | 29/527.4 |
| 4,455,557 A | * | 6/1984 | Thomas | 72/379.2 |
| 4,578,851 A | * | 4/1986 | Song | 29/235 |
| 4,676,856 A | * | 6/1987 | Shigeki et al. | 156/201 |
| 4,688,310 A | * | 8/1987 | Kelm et al. | 72/379.2 |
| 4,830,898 A | * | 5/1989 | Smith | 29/527.4 |
| 5,307,548 A | * | 5/1994 | Engel | 72/379.2 |
| 5,946,962 A | * | 9/1999 | Fukuda et al. | 72/335 |
| 6,502,305 B2 | * | 1/2003 | Martins et al. | 72/379.2 |

FOREIGN PATENT DOCUMENTS

| | | |
|---|---|---|
| DE | 41 25 344 A1 | 2/1993 |
| DE | 42 13 653 A1 | 10/1993 |
| DE | 4213653 | 7/1996 |
| DE | 4125344 | 9/1996 |
| EP | 0 922 888 B1 | 5/2003 |
| FR | 2 574 891 A1 | 6/1986 |

* cited by examiner

Primary Examiner—David P. Bryant
(74) Attorney, Agent, or Firm—Howard & Howard

(57) ABSTRACT

Process for production of a metal reinforced sealing element, in which a metal carrier element is provided with several cutouts, the remaining material is subjected to a pressure forming process, with material deformation in the cutouts, to create a selectable contour of the carrier element, and subsequently a sealing profile is introduced in the formed contour.

9 Claims, 2 Drawing Sheets

Figure 1:
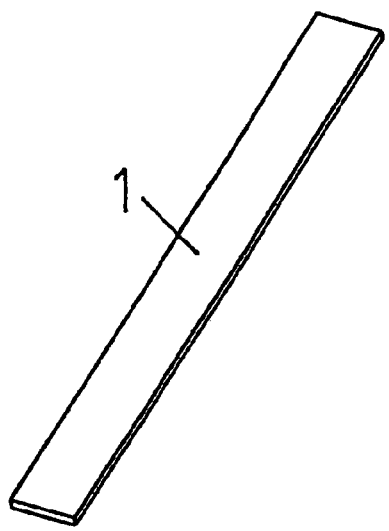

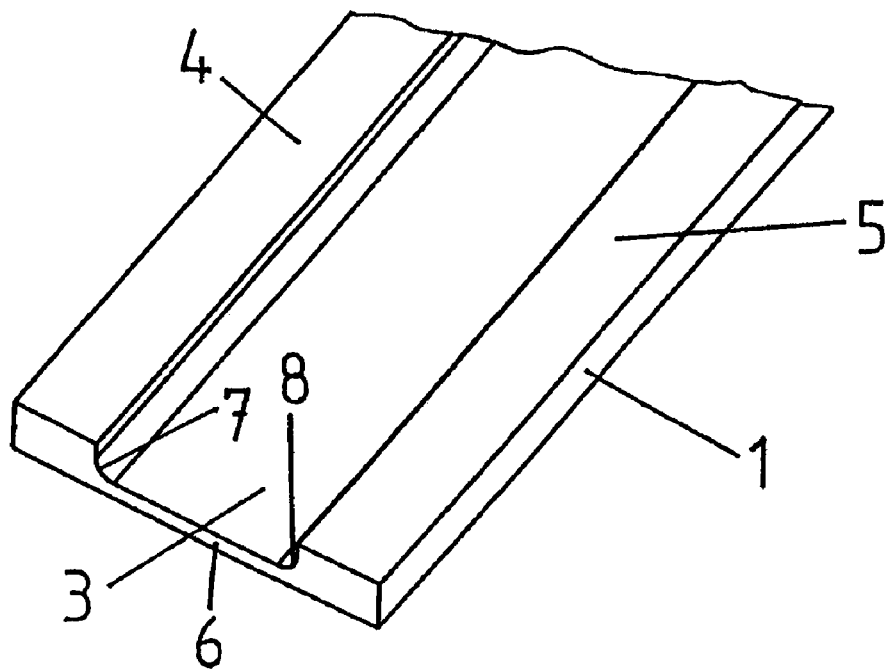
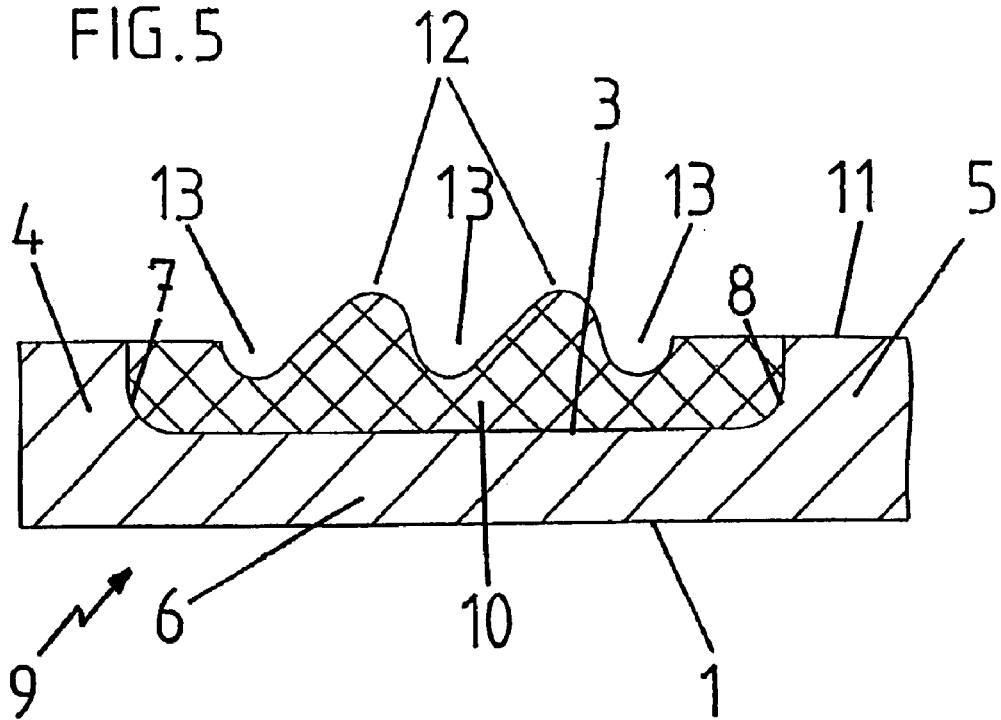

PROCESS FOR PRODUCTION OF SEALING ELEMENTS AND SEALING ELEMENT

This application claims the benefit of German Patent Application No. 102 37 019, filed Aug. 13, 2002.

The invention is a process for production of a metal reinforced sealing element.

A metal reinforced rubber form seal for sealing two formed parts that are to be pressed against each other using screw bolts is found in DE-C 41 25 344, made of a fully non-vulcanized carrier plate, where the rubber layer vulcanized in place has lengthwise sealing ridges and, at least halfway on the inner side, encircling sealing lips around the screw holes that penetrate the seal, and on which supports are provided at the screw holes that limit the height of the seal gap between the two formed parts. In DE-C 42 13 653, a rubber form seal is described that consists of a carrier plate sprayed with a rubber mixture, provided with openings, and with supporting elements arranged around the opening in the form of a ring, which are pressed into the carrier plate. The supporting elements are provided with a perimeter groove. The openings in the carrier plate have a diameter associated with the groove base diameter, and are provided with a cutout leading outward, whose width is slightly less than this diameter.

There are sealing systems for which it is necessary to make sealing lips only on one side of a carrier material. Under the state of the technology quoted above, this is not possible.

It is generally known that applications with single-sided sealing and carrier seals are made of plastic in current applications. The carrier frame is made as an injection molded part, so that introduction of a one-sided groove does not present a problem. For plastic carriers, however, the following problems exist: they do not provide sufficient resistance to media; their seating behavior is not optimal; and in most cases they are only suitable for application of silicone sealing profiles.

If, in contrast, a metal carrier element were used, and if an appropriate cavity for rubber or plastic material were provided in the sealing area, the follow problems present themselves:

Under pressure deformation of a continuous surface, there is no or only a little press-in depth, since no or very little material is deformed.

The invention takes on the task of preparing a process for production of a metal reinforced sealing element that, while using a metal carrier element, nevertheless allows that a one-sided seal in the area of the carrier element can simply be made, without the problems described in the state of the technology appearing. Further, a sealing element shall be concepted that is simple in construction and application.

This task is solved by a process for production of a metal reinforced sealing element, in which a metal carrier element is provided with several cutouts, the remaining material is subjected to a pressure forming process, with material deformation in the cutouts, to create a selectable contour of the carrier element, and subsequently a sealing profile is introduced in the formed contour.

Advantageous developments of the process in the invention are found in the associated sub-claims.

This task is also solved by a metal reinforced sealing element, in which a sealing profile is applied to a lengthwise groove of a carrier element, created by pressing. Advantageous developments of the invented sealing element are found in the associated sub-claims.

With the object of the invention, it is possible, especially for carrier elements made of sheet metal strips, preferably made of aluminum or an aluminum alloy, to provide appropriate deformation areas, where during the pressure deformation, the material in previously stamped-out openings is deformed, closing these mostly or even completely. Through this measure, the penetration depth of the carrier element can be significantly increased.

If it is not possible that the deformed material completely closes the cutouts, a seal must be provided from the underside of the carrier element upon later injection of the sealing profile, especially one consisting of elastomer material. In application, such sealing elements are advantageous as static seals in lid areas of housings or similar.

Figure 2:
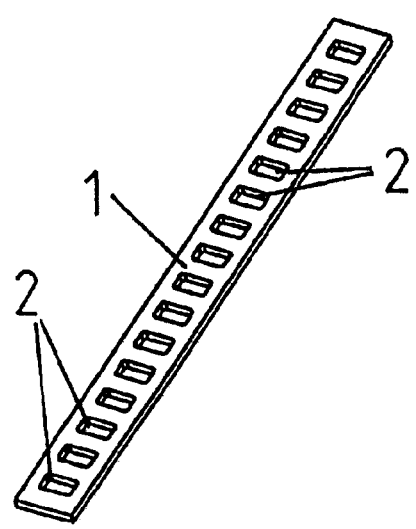
Figure 3:
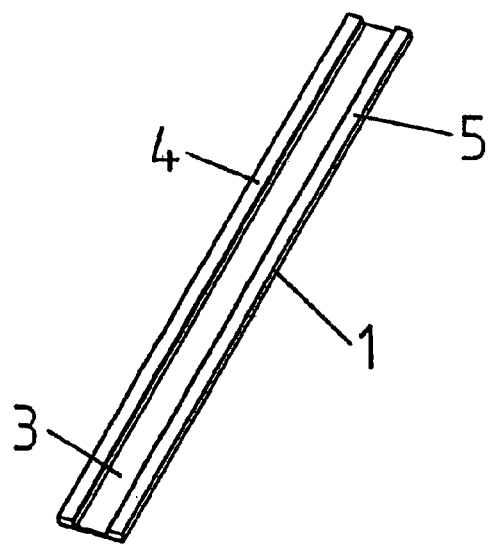

The object of the invention is shown in the drawing using an application example and is described as follows. Shown are:

FIGS. 1 to 5 Production process for a metal reinforced sealing element per the invention FIGS. 1 to 5 show the production flow of a metal reinforced sealing element, usable, for example, as a static seal between a housing and a lid (not shown). FIG. 1 shows a sheet metal strip 1, in this case made of aluminum, as the carrier element, which can be unwound from a coil. The sheet metal strip 1 runs through a piercing machine and is, as shown in FIG. 2, provided with a large number of parallel running, rectangular in this example, cutouts 2. Per FIG. 3, the sheet metal strip 1 runs through the area of a pressing machine. Due to the press forces exerted there, the remaining material of the sheet metal strip 1 is deformed into the cutouts 2 per FIG. 2, and closes them essentially completely. In FIG. 3 is shown that the openings made in FIG. 2 are completely closed, so that the sheet metal strip 1 then has a continuous inner surface 3. Due to the pressing process, higher side areas 4,5 are created, so that a U-shaped cross section is created. In this condition, the sheet metal strip 1 can now be cut to length, as shown in FIG. 4, for example. The higher side areas 4,5 can be see, along with the connection area 6 and the continuous inner surface 3. The areas 4,5 flow over radii 7,8 into the connection area 6.

FIG. 5 shows the finished sealing element 9, containing the pressed carrier element 1.

The higher areas 4,5 can be seen, as well as the connection area 6 and the transition radii 7,8. The carrier element 1 thereby creates a nearly U-shaped cross section. On one side, in the free space (inner surface), a sealing profile 10 made of elastomer material is injected, whereby extending sealing lips 12 are formed over the limiting edge 11 of the carrier element 1. On one side, between the sealing lips 12, and on the other side, in the free area of the elastomer material, canyon-like cutouts 13 are provided, in which the material of the sealing lips 12 can flow under the pressure effect in the installed condition.

What is claimed is:

1. Process for production of a metal reinforce sealing element (9), in which a metal carrier element (1) is provided with several cutouts (2), the remaining material is subjected to a pressing operation under material deformation into the cutouts (2), to create a selectable contour of the carrier element (1), and subsequently a sealing profile (10) is applied to the created contour.

2. Process as in claim 1, characterized in that a sheet metal strip is used as a carrier element (1).

3. Process as in claim 1 or 2, characterized in that a large number of parallel running cutouts (2) are provided in the carrier element (1) by piercing.

4. Process as in claim 1, characterized in that the contour of the carrier element (1) is created by one-sided pressing.

5. Process as in claim 4, characterized in that the material pressed into the cutouts (2) by pressing the carrier element (1) essentially completely closes the cutouts (2).

6. Process as in claim 4, characterized in that the pressing operation creates an essentially U-shaped cross sectional profile of the carrier element.

7. Process as in claim 1, characterized in that in the open areas of the carrier element (1), a sealing profile (10) of selectable outer contour is injected.

8. Process as in claim 1, characterized in that the sealing profile is created with several sealing lips (12) that extend beyond the limiting edge (11) of the carrier element (1), as well as in cutouts remaining in the area of the inner contour of the carrier element.

9. Process as in claim 2, characterized in that the sheet metal strip is made of aluminum or aluminum alloy.

* * * * *